C. A. CASE.
MECHANICAL MOVEMENT.
APPLICATION FILED JAN. 29, 1917.
1,283,666.
Patented Nov. 5, 1918.
3 SHEETS—SHEET 3.
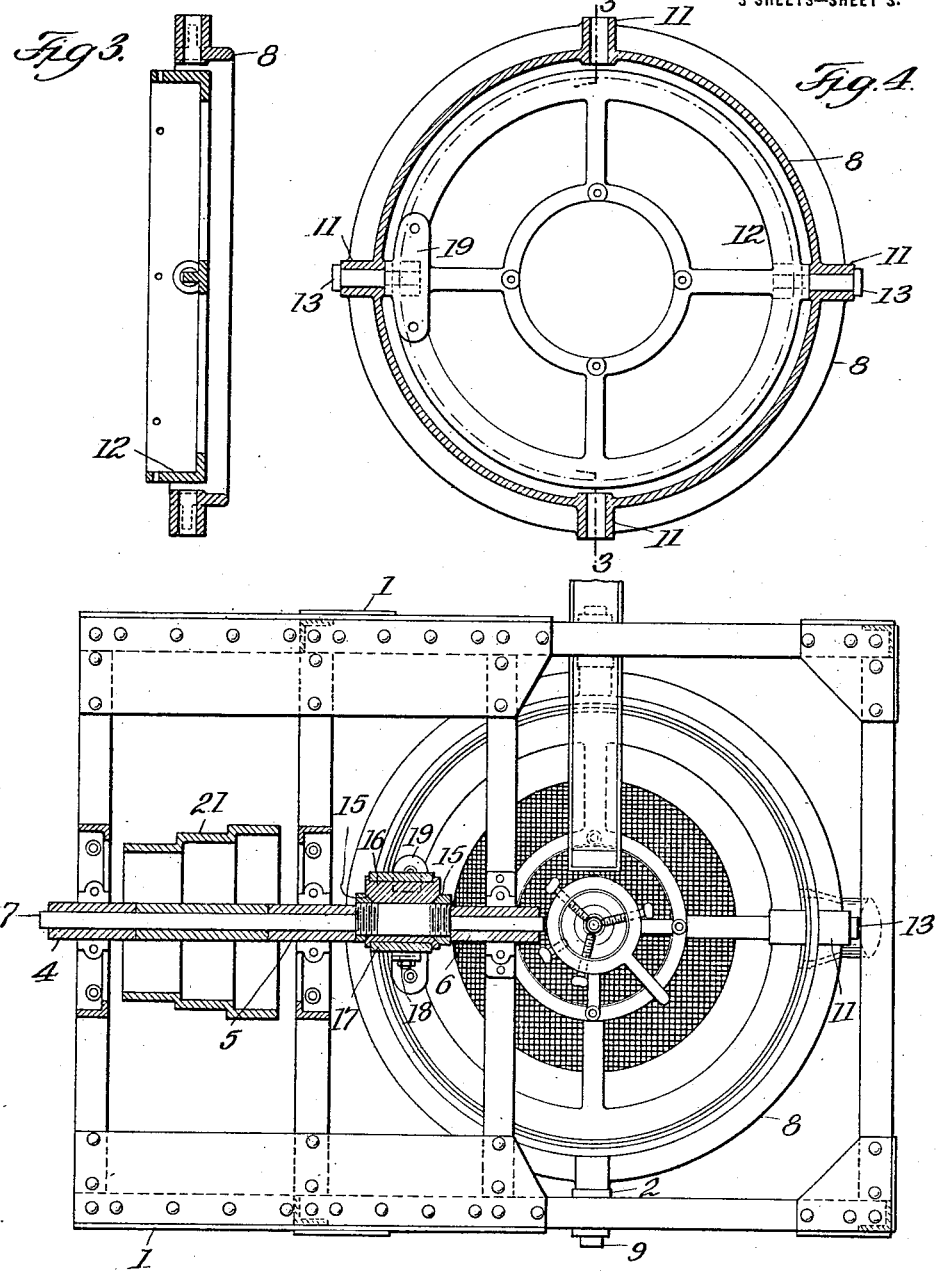

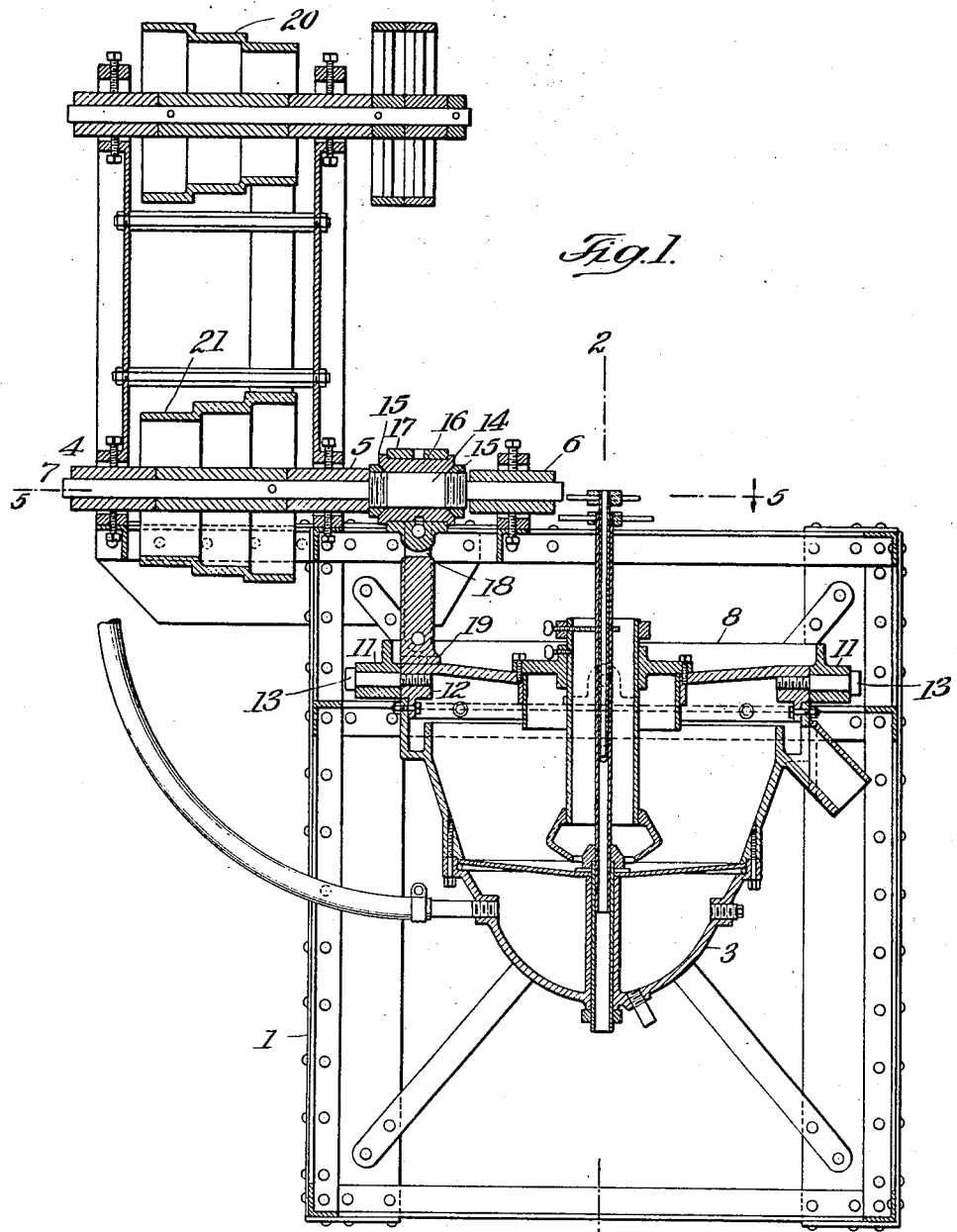

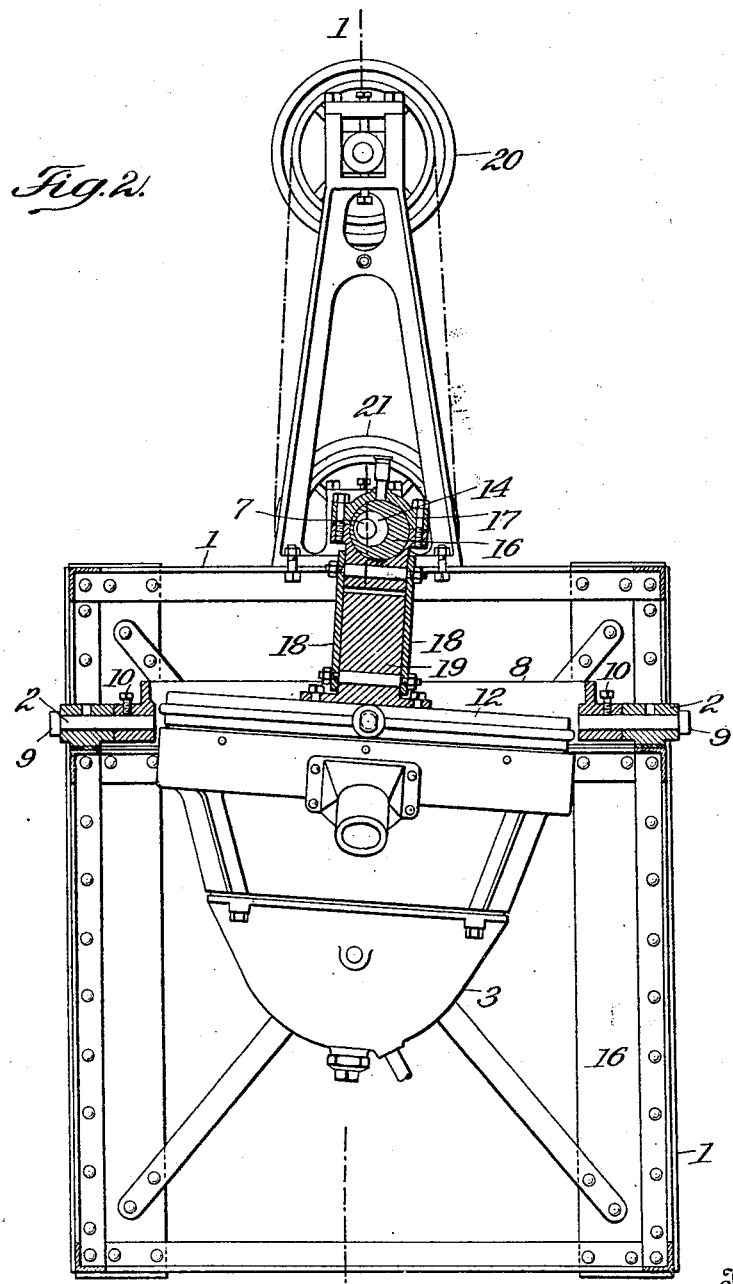

UNITED STATES PATENT OFFICE.

CHARLES A. CASE, OF NEW ROCHELLE, NEW YORK.

MECHANICAL MOVEMENT.

1,283,666. Specification of Letters Patent. Patented Nov. 5, 1918.

Original application filed May 9, 1916, Serial No. 96,311. Divided and this application filed January 29, 1917. Serial No. 145,129.

*To all whom it may concern:*

Be it known that I, CHARLES A. CASE, a citizen of the United States, residing at New Rochelle, in the county of Westchester and State of New York, have invented a certain new and useful Mechanical Movement, of which the following is a specification.

The invention described and claimed in this application, which is a division of my application Serial Number 96,311, filed May 9th, 1916, relates to a mechanical movement useful in actuating any element of mechanism to which it is desired to give a swinging motion. To accomplish this, I support the element to be actuated upon a gimbal-ring or in some other way, so that it may tip freely in all directions and actuate it by means of a hinged link eccentrically connected to a rotary shaft.

An important object of my invention is to provide a simple mechanism for giving to a concentrator pan or bowl a circular motion, such as that used in hand panning. My invention is, however, by no means limited to this use, but may be used in any separating, churning or other device in which a swinging motion is desirable.

In order that my invention may clearly be understood, I will describe a specific embodiment of it shown in the annexed drawings, which illustrate a concentrator incorporating my invention.

Figure 1 is a sectional elevation taken upon the line 1—1 of Fig. 2.

Fig. 2 is a sectional elevation taken upon the lines 2—2 of Fig. 1.

Fig. 3 is a vertical section of the gimbals on the line 3—3 of Fig. 4.

Fig. 4 is a top view, partly in section, of the gimbals.

Fig. 5 is a sectional top view of the concentrator taken on the line 5—5 of Fig. 1.

The frame-work 1 of the machine, which may be of any desired construction, supports the bearings 2, 2, upon which the gimbal-ring which supports the pan or bowl 3 is mounted, and the bearings 4, 5 and 6 for the shaft 7. The gimbal-ring 8 is supported by the pins 9, which pass loosely through the bearings 2, 2, and are rigidly fastened to the ring 8 by means of set-screws 10. The gimbal-ring 8 has the bearings 11, 11, on which the collar or inner gimbal 12 is mounted. Pins 13 pass loosely through the bearings 11, 11, and are screwed to the collar 12. The upper edge of the pan or bowl 3 is bolted to a flange projecting downwardly from the collar 12. By the means described, the bowl 3 with its collar 12 is so supported that it may tip freely in all directions about a fixed pivotal point, which is the point of intersection of the center lines of the pins 9 and the pins 13.

Upon the shaft 7 is mounted a small eccentric 14. The ends of the small eccentric 14 are threaded and upon each is screwed a nut 15 having a conical inner surface. Upon the eccentric 14, between the nuts 15, is mounted a large eccentric 16. This eccentric has a female conical surface at each end engaging the conical surface of the nut 15. The large eccentric 16 is normally held in fixed relation to the small eccentric 14 by the nuts 15. By screwing the nuts away from each other, however, the eccentric 16 may be loosened upon the eccentric 14 and rotated upon it so as to vary the length of the stroke of the eccentric-strap mounted upon it.

The eccentric-strap 17 surrounds the eccentric 16. To this eccentric-strap is attached the double link 18, which is hinged to a bracket 19, mounted upon the collar 12, upon an axis which is perpendicular to the plane passing through the pivotal point and the link. It will be observed that the connection between the eccentric-strap and the collar is capable of bending in a plane parallel to the shaft upon which the eccentric is mounted, but is incapable of bending in a plane perpendicular to this shaft. The shaft 7 may be driven in any convenient way, and provision—as, for example, the cone-pulleys 20 and 21—may be made for changing its speed.

The operation of the machine is as follows:—The shaft 7 is rotated by power applied to the belt-wheel 43. The eccentric-strap 17 upon the eccentric 16 imparts motion to the collar 12, to which the pan or bowl is attached. As seen in Fig. 2, when the eccentric is at one side of the center of the shaft 7, the bowl is rocked upon the pins 13, because the connection between the eccentric-strap and the bowl is unbending in a plane perpendicular to the shaft 7. When the eccentric is above or below the center of the shaft 7, the portion of the collar to which the bracket 19 is attached is pulled up or pressed down so that the pan is given a rocking motion upon the pins 9. The result of these two rocking motions taking place simultaneously is to give the lower portion of the pan a swinging motion. It is desirable to have the lower end of the pan move in a perfect circle. This may be accomplished by placing the eccentric 16 upon such a point on the shaft 7 that when the eccentric is turned to the position shown in Fig. 2, the link 18 is perpendicular to the shaft 7, and making the distance from the fixed pivotal point of the bowl 3 to the center line of the shaft 7 equal to the distance from said fixed pivotal point to the center line of the link 18, when said link is perpendicular to the shaft 7.

My invention is by no means limited to the specific embodiment described. The eccentric connection between the link and the shaft may, for example, be made by means of a crank-pin instead of an eccentric. I prefer the eccentric, however, owing to the fact that it provides a greater bearing surface than a crank-pin does and permits of easy means for adjusting the length of the stroke. Many other changes may be made without departing from my invention.

I claim as my invention:—

1. A mechanical movement comprising a swinging element, a gimbal-ring supporting said element, a rotary shaft, a link eccentrically attached to said shaft and attached to said element.

2. A mechanical movement comprising a swinging element, a gimbal-ring supporting said element, a rotary shaft, a link eccentrically attached to said shaft and hinged to said element.

3. A mechanical movement comprising a swinging element, a gimbal-ring supporting said element, a rotary shaft parallel to a radius of said ring, a link eccentrically attached to said shaft and hinged to an eccentric point on said element, said link being capable of bending in a plane parallel to said shaft but incapable of bending in a plane at right angles to said shaft.

4. A mechanical movement comprising a swinging element, a gimbal-ring supporting said element, a rotary shaft parallel to a radius of said ring, a link eccentrically connected to said shaft and hinged to said element upon an axis perpendicular to said shaft.

5. A mechanical movement comprising a swinging element, a gimbal-ring supporting said element, a rotary shaft parallel to a radius of said ring, an eccentric upon said shaft, an eccentric-strap upon said eccentric, a bracket at an eccentric point upon said swinging element, a link connecting said eccentric-strap with said bracket and hinged upon pins perpendicular to the axis of said shaft.

6. A mechanical movement comprising a swinging element, a gimbal-ring supporting said element, a shaft parallel to a radius of said ring, an eccentric rigidly mounted upon said shaft, an eccentric loosely mounted upon said eccentric, and means for locking said eccentrics together, an eccentric-strap mounted upon said power eccentric, and a link attached to said eccentric-strap and hinged to said swinging element.

7. A mechanical movement comprising an element so supported that it may tip in all directions about a fixed pivotal point, and means for actuating said element comprising a link attached to said element and capable of bending in the plane passing through said link and said pivotal point and incapable of bending in other directions, and means for moving the free end of said link in a circle.

8. A mechanical movement comprising an element so supported that it may tip in all directions about a fixed pivotal point, and means for actuating said element comprising a link attached to said element and capable of bending in the plane passing through said link and said pivotal point, and means for moving the free end of said link in a circle in a plane perpendicular to said plane.

9. A mechanical movement comprising an element so supported that it may tip in all directions about a fixed pivotal point, and means for actuating said element comprising a link attached to said element and capable of bending in the plane passing through said link and said pivotal point, and means for moving the free end of said link in a closed path in a plane perpendicular to said plane.

10. A mechanical movement comprising an element so supported that it may tip in all directions about a fixed pivotal point, and means for actuating said element comprising a link hinged to said element upon an axis perpendicular to the plane passing through said link and said pivotal point, and means for moving the free end of said link in a circle in a plane parallel to said hinge axis.

11. A mechanical movement comprising an element so supported that it may tip in all directions about a fixed pivotal point; and means for actuating said element comprising a link, at one end hinged to said element upon an axis perpendicular to the plane passing through said link and said pivotal point, and at the other end eccentrically connected to a shaft perpendicular to said hinge axis.

12. A mechanical movement comprising an element so supported that it may be tipped in all directions, and means for actuating said element comprising a rotary shaft, and a link eccentrically attached to said shaft and hinged to said element upon an axis perpendicular to said shaft.

13. A mechanical movement comprising an element so supported that it may be tipped in all directions about a fixed pivotal point, and means for actuating said element comprising a rotary shaft, and a link eccentrically attached to said shaft and hinged to said element upon an axis perpendicular to said shaft.

14. A mechanical movement comprising an element so supported that it may be tipped in all directions about a fixed pivotal point, and means for actuating said element comprising a shaft, and a link eccentrically connected to said shaft and hinged to said element on an axis perpendicular to said shaft, the mean position of said link being perpendicular to said shaft and the distance from said pivotal point to said shaft being equal to the distance from said pivotal point to said link when in its mean position.

CHARLES A. CASE.

Copies of this patent may be obtained for five cents each, by addressing the "Commissioner of Patents, Washington, D. C."